INVENTOR.
CLINTON A. WADE

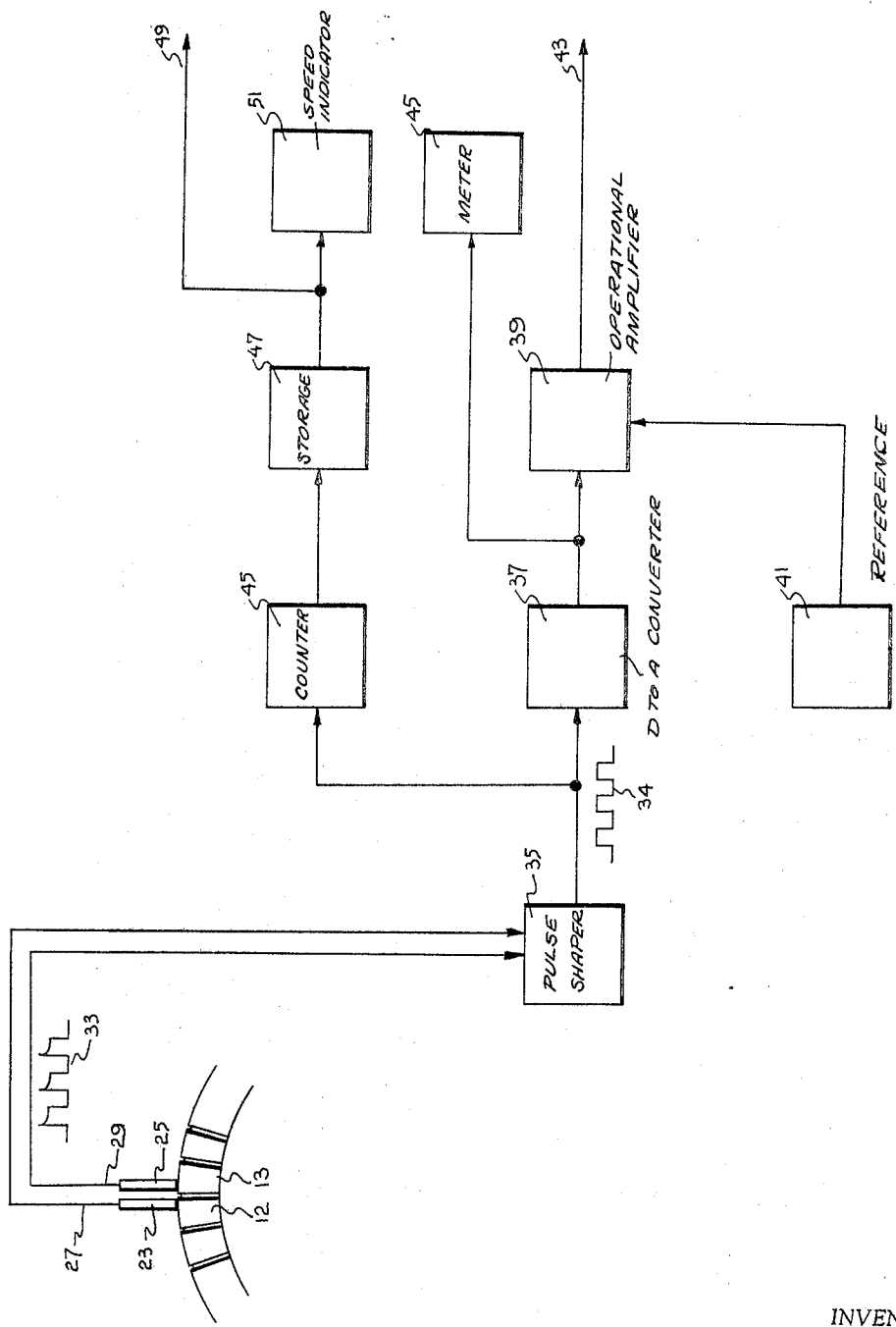

United States Patent Office 3,484,686
Patented Dec. 16, 1969

3,484,686
TACHOMETER FOR A D.C. MOTOR UTILIZING AN AUXILIARY PAIR OF BRUSHES
Clinton A. Wade, Salem, Va., assignor to General Electric Company, a corporation of New York
Filed Aug. 4, 1967, Ser. No. 658,369
Int. Cl. G01r *11/02*
U.S. Cl. 324—70                    3 Claims

ABSTRACT OF THE DISCLOSURE

A tachometer using voltage fluctuations obtained from the commutator of a D.C. motor by a pair of brushes which make contact with the commutator and are so spaced that they alternately contact the same commutator strip and two adjacent commutator strips as the commutator is rotated. The voltage fluctuations are applied to a measuring device for displaying or recording of the frequency of fluctuations.

BACKGROUND OF THE INVENTION

The invention is directed to an apparatus for measuring rotational speed of driving equipment and in particular to the measurement of rotational speed of direct current motors. Presently to determine the rotational speed of rotating equipment, it is necessary to attach thereto a tachometer which produces either an analog signal proportional to the speed of the equipment, or a series of pulses with a frequency which is proportional to the speed of the rotating equipment. The derived signals are used for monitoring or controlling the speed of the rotating equipment. The attachment of such tachometers involves mounting the tachometer to the rotating equipment and in many cases it involves gearing and belting or other drive means.

In additional to the difficulty involved in the mounting of the gearing and/or belting facilities there are further problems with these methods of obtaining signals. First there is slip in the belting and frequencies set up in the slack of the belt due to the flexibility inherent in that type of drive transmission are causing harmonics to arise.

Chain drives as with belt drives produce harmonics due to the resonance of the chain and in addition to this produce deviations by the chain contacting the teeth of the sprockets. With gear systems there is the problem of backlash and the space limitations, as well as the problems which arise from the lateral play in the drive motor bearings which practically eliminate direct coupling of the gearing to the shaft of the drive motor. This lateral play also prevents direct coupling of the tachometer to the drive motor.

Under some atmospheric conditions it is not possible to mount a pulse tachometer with the motor of which the rotational speed is to be measured. It then becomes necessary for the motor to drive a selsyn transmitter which in turn drives a receiver connected to the tachometer, thereby providing a rather elastic coupling between the motor and the tachometer, whereby the pulses produced by the tachometer are caused to be unevenly distributed.

All pulse tachometers require an external power source and in most cases a means for conditioning the signal to make it powerful enough to transmit the signal over reasonable distances.

Most pulse tachometers produce pulses only and are not sensitive in determining the direction of rotation of the equipment. To determine direction of rotation requires specially designed tachometers which include the additional equipment required for steering the pulses produced by the tachometer.

The present invention completely eliminates all of the above-enumerated problems and will provide the system with an accurate pulsed signal proportional to the exact rotational speed of the motor, and indicative of its direction.

Summary of the invention

For determining the speed of a direct current motor, a tachometer comprising a pair of brushes for coacting with the commutator bars of the motor wherein the two brushes are so spaced, to be alternately shorted out through contact with one single commutator bar, and make contact with two adjacent commutator bars when the armature of the motor is rotating, whereby a pulsed signal is produced which has frequency which is proportional to the speed of the motor.

Resolution of the tachometer can be increased by placing several pairs of current carrying brushes, each pair being circumferentially spaced around the surface of the commutator, so that each pair produces a pulse signal in turn, whereby the total number of pulses produced by the speed measuring device is increased as a multiple of the number of pairs of brushes.

Brief description of the drawings

FIGURE 3 is a block diagram for connecting tachometer into monitoring circuit.

Detailed description of the invention

Figure 1:
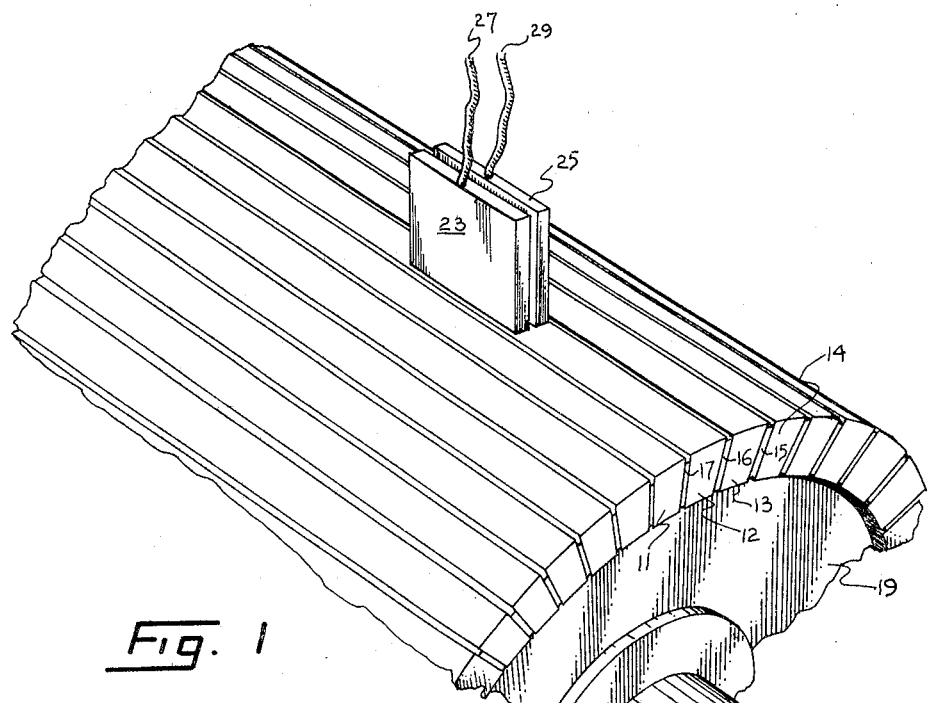
FIGURE 1 shows a pair of brushes contacting the same commutator bar.

Referring now to FIGURE 1 a motor commutator having a series of commutator bars 11–14 electrically insulated from each other by mica strips 15–17 is shown to be mounted on hub 19 which is supported by shaft 21. Brushes 23 and 25 having connection leads 27 and 29, respectively, are supported by a stationary mounted brush holder (not shown) so that they successively make contact with the commutator bars as the commutator rotates beneath the brushes. It is to be noted that the brushes 23 and 25 are auxiliary to the brushes which carry current to the armature for its operation, hereafter explained. FIGURE 1 shows the commutator so positioned that both the brushes 23 and 25 are in contact with the same commutator bar 12. In this description the rotation of the commutator is assumed to be counterclockwise although in practical use the direction of rotation is of no consequence, with the exception that the polarity of the output of the brushes 23 and 25 changes with a change in direction of rotation.

Figure 2:
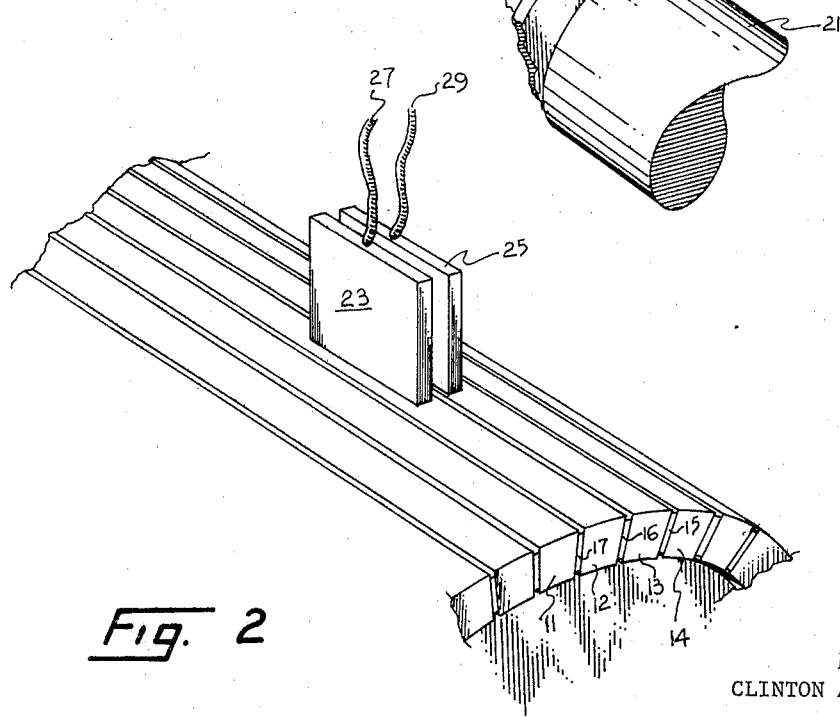
FIGURE 2 shows the same pair of brushes contacting two adjacent commutator bars.

In FIGURE 2 the commutator is shown to have rotated in the counterclockwise direction and brushes 23 and 25 are now shown to make contact with two commutator bars 12 and 13, respectively, which are electrically separated by mica strip 16. In a commutator, adjacent commutator bars are connected to the ends of one of the winding coils in the motor armature. Normally the brushes (not shown) which supply power to the armature (not shown) are so situated that the voltage between adjacent commutator bars, i.e., the voltage in a single winding coil is at a minimum when the supply brushes span the specific commutator bars. As the armature, hence the commutator, rotates, the voltage in the armature winding coils rises to a maximum and then reduces again to zero at a point where the next supply brush spans the particular commutator bars. The phase to neutral voltage which thus is produced forms a sine wave. The brushes 23 and 25 should therefore be positioned between the supply brushes at a point where the voltage at the commutator strips is greatest, so that the signal derived from the commutator bars 12 and 13 by brushes 23 and 25, respectively, is of such a value to be able to be transmitted.

As the commutator rotates, the brushes 23 and 25 are alternately shorted on one commutator strip as in FIGURE 1 and receive a voltage from two commutator strips as in FIGURE 2, which results in a series of pulses which has a frequency proportional to the speed of the motor.

While the invention is described utilizing one pair of brushes, it is within the scope of this invention to mount a plurality of pairs of brushes circumferentially spaced around the commutator of the motor, so that a commutator bar shorts out each pair of brushes successively, whereby the total number of pulses thus produced is increased as a multiple of the number of pairs of brushes and whereby the resolution of the tachometer is improved by an equal amount.

The pulses so derived may be utilized as shown in FIGURE 3, wherein brushes 23 and 25 having connecting leads 27 and 29 are positioned on commutator strips 12 and 13. The pulses produced when the armature (not shown) and commutator are rotating are shaped as shown by the pulse train 33 and are applied to pulse shaper 35, which produces a square wave train 34 of the same frequency as that produced by the output of the brushes 23 and 25. Depending on whether an analog signal with a value equivalent to the speed of the motor or a digital signal having a frequency which is proportional to the speed of the motor is required are these pulses directed to different pulse utilizing circuits. In one example of an analog pulse utilizing circuit, the pulses are applied to digital-to-analog converter 37 which applies its output to an operational amplifier 39. An analog reference signal from a reference device 41, such as a potentiometer is applied to the operational amplifier 39, which produces an error signal 43 equal to the difference between the output of the digital-to-analog converter 37 and the output of the reference device 41. This error signal 43 may be used for controlling the speed of the motor by connecting it to a speed control (not shown). For monitoring the speed of the motor the output of the digital-to-analog converter is applied to a meter 45 which then registers average voltage and is calibrated in revolutions per minute or feet per second or the like depending on the use of the equipment.

In an example of a digital pulse utilizing circuit, the square wave pulse train 34 from pulse shaper 35 is applied to a counter which converts the pulses to a binary coded digital signal and applies this to a storage unit 47 at predetermined intervals. The output of the storage unit 47 is applied to a computer or output recording device through lead 49. A digital speed indicator 51 may be connected to the output of storage unit 47 to give the operator a visual indication of the speed of the machine.

What is claimed is:

1. For use with a direct current motor having an armature commutator with circumferentially spaced bars separated from each other by electrical insulating members, and a first pair of stationarily positioned current carrying brushes for conducting current from an external source to the armature, a tachometer comprising:
    (a) an auxiliary pair of current carrying brushes for producing a pulsed output signal, said auxiliary pair of brushes held in contact with the commutator bars and having points of contact separated at a distance greater than the thickness of the insulating member and less than the width of a commutator bar,
    (b) a pulse modifying circuit connected to said auxiliary pair of current carrying brushes for shaping said pulsed output signal,
    (c) means connected to said modifying circuit for converting said shaped pulsed output signal to a signal indicative of rotational speed of the armature.

2. The invention claimed in claim 1 wherein converting means comprises:
    (a) a digital counter for accumulating the shaped pulsed output signal for a unit period of time,
    (b) means responsive to the contents of said counter at the end of said unit period of time for providing a signal indicative of rotational speed of the armature.

3. The invention claimed in claim 1 wherein the converting means comprises:
    (a) a digital to analog converter for converting the said shaped pulsed output to provide a voltage proportional to the number of pulses produced during a unit period of time,
    (b) means responsive to the said voltage for producing a signal at the end of said unit period of time for providing a signal indicative of rotational speed of the armature.

References Cited

UNITED STATES PATENTS

| 2,906,953 | 9/1959 | Stadler | 324—70 |
| 3,346,725 | 10/1967 | Allured | 324—70 |
| 3,108,216 | 10/1963 | Fritz | 321—50 |

FOREIGN PATENTS

| 125,257 | 11/1926 | Switzerland. |
| 561,826 | 6/1944 | Great Britain. |

ARCHIE R. BORCHELT, Primary Examiner

M. J. LYNCH, Assistant Examiner

U.S. Cl. X.R.

310—248; 317—5